(12) United States Patent
Nishimi et al.

(10) Patent No.: US 8,332,958 B2
(45) Date of Patent: Dec. 11, 2012

(54) IMAGE FORMING SYSTEM

(75) Inventors: Toshitsugu Nishimi, Osaka (JP);
Yasushi Tsukamoto, Osaka (JP); Akira Fujikura, Osaka (JP); Daisuke Yoshida, Osaka (JP); Yasuhiko Kida, Osaka (JP); Yusuke Nakagoshi, Osaka (JP); Yumi Kitamura, Osaka (JP); Toshinobu Yoshida, Osaka (JP)

(73) Assignee: Kyocera Document Solutions Inc. (JP)

( * ) Notice: Subject to any disclaimer, the term of this patent is extended or adjusted under 35 U.S.C. 154(b) by 616 days.

(21) Appl. No.: 12/572,056

(22) Filed: Oct. 1, 2009

(65) Prior Publication Data

US 2010/0185858 A1 Jul. 22, 2010

(30) Foreign Application Priority Data

Jan. 20, 2009 (JP) ................................. 2009-010408
Jan. 20, 2009 (JP) ................................. 2009-010411
Jan. 20, 2009 (JP) ................................. 2009-010412

(51) Int. Cl.
*G06F 21/00* (2006.01)
(52) U.S. Cl. .................. 726/28; 726/4; 726/17; 726/19; 713/168; 380/51; 455/411; 705/44; 709/229; 358/1.14
(58) Field of Classification Search ................ 726/7, 28; 713/168
See application file for complete search history.

(56) References Cited

U.S. PATENT DOCUMENTS

| | | | | |
|---|---|---|---|---|
| 7,861,089 B2 * | 12/2010 | Tomita | ........................... | 713/182 |
| 8,090,948 B2 * | 1/2012 | Sugiura et al. | ................ | 713/175 |
| 2004/0130743 A1 * | 7/2004 | Nozato | ........................ | 358/1.14 |
| 2004/0190046 A1 * | 9/2004 | Ilda | ............................... | 358/1.15 |
| 2005/0044248 A1 * | 2/2005 | Mihira et al. | ................. | 709/229 |
| 2005/0105722 A1 * | 5/2005 | Hashimoto | ..................... | 380/51 |
| 2005/0193200 A1 * | 9/2005 | Akiba et al. | .................. | 713/168 |
| 2006/0072144 A1 * | 4/2006 | Dowling et al. | ............. | 358/1.15 |
| 2007/0013962 A1 * | 1/2007 | Hayashi | ........................ | 358/403 |
| 2007/0076240 A1 * | 4/2007 | Ogura | .......................... | 358/1.14 |
| 2007/0165273 A1 * | 7/2007 | Miyamura et al. | ........... | 358/1.15 |
| 2008/0189775 A1 * | 8/2008 | Fujita | ............................... | 726/7 |
| 2009/0021591 A1 * | 1/2009 | Sako | .......................... | 348/211.2 |

(Continued)

FOREIGN PATENT DOCUMENTS

CN 101226463 7/2008
(Continued)

OTHER PUBLICATIONS

Creese et al., "Authentication for Pervasive Computing", Security in Pervasive Computing 2003, LNCS 2802, pp. 116-129, 2004.*

*Primary Examiner* — Morshed Mehedi
(74) *Attorney, Agent, or Firm* — McDonnell Boehnen Hulbert & Berghoff LLP

(57) ABSTRACT

A Multi-Function peripheral (MFP), a server apparatus, and a client apparatus for generating image output data from document data and transmitting the image output data to the server apparatus are each connected to a network. In the server apparatus, an output data management unit stores the received image output data in an output data storage unit. Upon receiving user authentication information that is input with a user operation on the MFP, the server apparatus determines whether the user authentication information is valid. When the user authentication information is determined to be valid, the server apparatus transmits to the MFP one or more among the stored image output data associated with the user authentication information.

18 Claims, 12 Drawing Sheets

U.S. PATENT DOCUMENTS

2009/0091775 A1 * 4/2009 Yoshida .................. 358/1.13

FOREIGN PATENT DOCUMENTS

| | | |
|---|---|---|
| JP | 09-190312 | 7/1997 |
| JP | 09-251358 | 9/1997 |
| JP | 2004-168065 | 6/2004 |
| JP | 2005-316602 | 11/2005 |
| JP | 2006-011834 | 1/2006 |
| JP | 2007-034492 | 2/2007 |
| JP | 2007-034940 | 2/2007 |
| JP | 2007-245500 | 9/2007 |
| JP | 2008-059020 | 3/2008 |
| JP | 2008-117286 | 5/2008 |
| JP | 2008-162171 | 7/2008 |

* cited by examiner

FIG.5

| SERIAL NUMBER | USER ID | SAVE DATE INTO SERVER | TOTAL NUMBER OF PAGES PRINTED | THUMBNAIL IMAGE |
|---|---|---|---|---|
| 1 | A081272 | 2008/12/01 14:00 | 2 | |
| 2 | A081272 | 2008/11/22 11:23 | 1 | |
| 3 | A081272 | 2008/11/15 09:51 | 8 | |

PRINTING  FACSIMILE TRANSMISSION

FIG.8

NO RESPONSE FROM SERVER.
SELECT ONE OF FOLLOWING PROCESSES:

| SERVER SETTING | SELECTION OF ALTERNATE SERVER | END |

FIG.9

| USER AUTHENTICATION SETTING IN MFP 3 | RELAY PROCESS SETTING IN SERVER APPARATUS 2 | | | |
| --- | --- | --- | --- | --- |
| | TRANSFER PRINTING | DAM PRINTING | JOB SELECTIVE PRINTING | |
| | | | SINGLE AUTHENTICATION | FULL AUTHENTICATION |
| AUTHENTICATION OFF | OK | NG | NG | NG |
| LOCAL AUTHENTICATION | NG | NG | NG | NG |
| NETWORK AUTHENTICATION | NG | NG | NG | NG |
| INTERMEDIARY SERVER AUTHENTICATION | NG | NG | OK | OK |

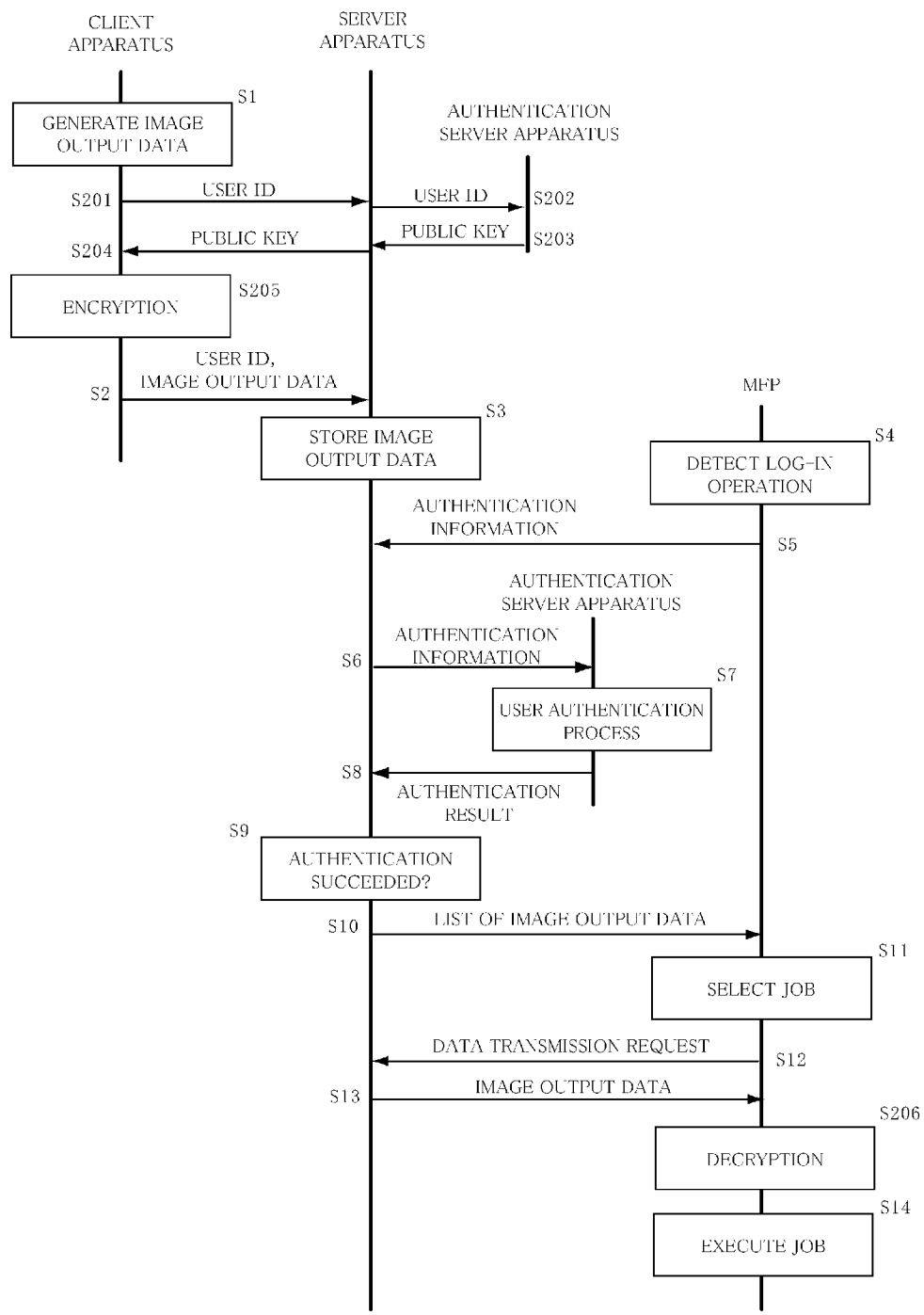

IMAGE FORMING SYSTEM

INCORPORATION BY REFERENCE

This application is based upon and claims the benefit of priority from corresponding Japanese Patent Application Nos. 2009-010408, 2009-010411, and 2009-010412, all filed Jan. 20, 2009, the entire contents of which is incorporated herein by reference.

BACKGROUND

1. Field of the Invention

The present invention relates to an image forming system.

2. Description of the Related Art

Some image forming apparatus connected to a network functions to, when it receives print data sent by a user from a personal computer (PC), store the print data, develop the print data into bit map image data after authentication of the user, and print the bit map image data (called the Secure Printing Function).

In an image forming system comprising the PC and the image forming apparatus, for example, the image forming apparatus acquires a user ID from an ID card associated with the user and determines whether the user ID matches a user identifier of the stored print data. If it is confirmed that the user ID and the user identifier match with each other, printing is executed.

Such an image forming system enables secure printing of a single print job sent from the user. However, it does not provide certain functionality that would allow secure printing for plural jobs sent from the user, such as data transmission of a second print job while a first job is being printed.

SUMMARY

The present invention relates to an image forming system that can execute various types of image output processes for plural jobs sent from a user while preventing secret leakage. Further, the present invention relates to an image forming system having a more effective (i.e. more secure) Secure Printing Function than the related art.

An image forming system according to an embodiment of the present invention comprises an image forming apparatus connected to a network, a server apparatus connected to the network, and a client apparatus connected to the network. Image output data is generated from document data at the client apparatus, and is transmitted to the server apparatus. The server apparatus comprises a first communication device connected to the network, a data reception unit configured to receive the image output data through the first communication device, a data management unit configured to store the image output data in a storage device, and an authentication processing unit configured to receive user authentication information from the image forming apparatus or an electronic apparatus associated with the image forming apparatus, through the first communication device via the network, and to determine whether the user authentication information is valid. In addition, the server apparatus comprises a data transmission unit configured, when the user authentication information is determined to be valid, to transmit at least a portion of the image output data associated with the user authentication information to the image forming apparatus through the first communication device.

Further, in the image forming system according to this embodiment, the image forming apparatus comprises a second communication device connected to the network, an acquisition unit configured to acquire the user authentication information, and a control unit configured to transmit the user authentication information to the server apparatus through the second communication device, to receive the image output data from the server apparatus through the second communication device, and to execute an image output process on the received image output data.

In another embodiment of the present invention, an image forming apparatus is connected to a network and belongs to one of a plurality of apparatus groups, a server apparatus is connected to the network, and a client apparatus is connected to the network. Image output data is generated from document data, and transmitted to the server apparatus by an output driver. The server apparatus comprises a first communication device connected to the network, a data reception unit configured to receive the image output data through the first communication device, a data management unit configured to store the image output data in a storage device, in association with apparatus group identification information of the apparatus group associated with the output driver, and an authentication processing unit configured to receive user authentication information from the image forming apparatus or from an electronic apparatus associated with the image forming apparatus, through the first communication device via the network, and to determine whether the user authentication information is valid. The server apparatus further comprises a data transmission unit configured, when the user authentication information is determined to be valid, to transmit at least a portion of the image output data associated with the apparatus group identification information of the apparatus group including the image forming apparatus and associated with the user authentication information, to the image forming apparatus through the first communication device.

Further, in accordance with another embodiment, the image forming apparatus comprises a second communication device connected to the network, an acquisition unit configured to acquire the user authentication information, and a control unit configured to transmit the user authentication information to the server apparatus through the second communication device, to receive the image output data from the server apparatus through the second communication device, and to execute an image output process on the received image output data.

An image forming system according to yet another embodiment of the present invention comprises an image forming apparatus, a server apparatus, and a client apparatus all connected to a network. Image output data is generated from document data, encrypted, and transmitted to the server apparatus. The server apparatus comprises a first communication device connected to the network, a data reception unit configured to receive the encrypted image output data through the first communication device, a data management unit configured to store the encrypted image output data in a storage device, an authentication processing unit configured to receive user authentication information from the image forming apparatus or from an electronic apparatus associated with the image forming apparatus, through the first communication device via the network, and to determine whether the user authentication information is valid, and a data transmission unit configured, when the user authentication information is determined to be valid, to transmit at least a portion of the encrypted image output data associated with the user authentication information to the image forming apparatus through the first communication device.

Further, in the image forming system according to the yet another embodiment, the image forming apparatus comprises a second communication device connected to the network, an acquisition unit configured to acquire the user authentication information, and a control unit configured to transmit the user authentication information to the server apparatus through the second communication device, to receive the encrypted image output data from the server apparatus through the second communication device, to decrypt the encrypted image output data, and to execute an image output process on the decrypted image output data.

Additional features and advantages are described herein, and will be apparent from the following Detailed Description and the figures.

BRIEF DESCRIPTION OF THE FIGURES

In the accompanying drawings:

FIG. 5 illustrates an example of a screen displaying a list of image output data in the first embodiment;

FIG. 8 illustrates one example of a screen displaying an error message in a fourth embodiment;

FIG. 9 is a table illustrating one example of compatibility data in a fifth embodiment;

FIG. 12 is a sequence chart to explain a process of causing the MFP to execute a job in the image forming system illustrated in FIG. 11.

DETAILED DESCRIPTION

<First Embodiment>

Figure 1:
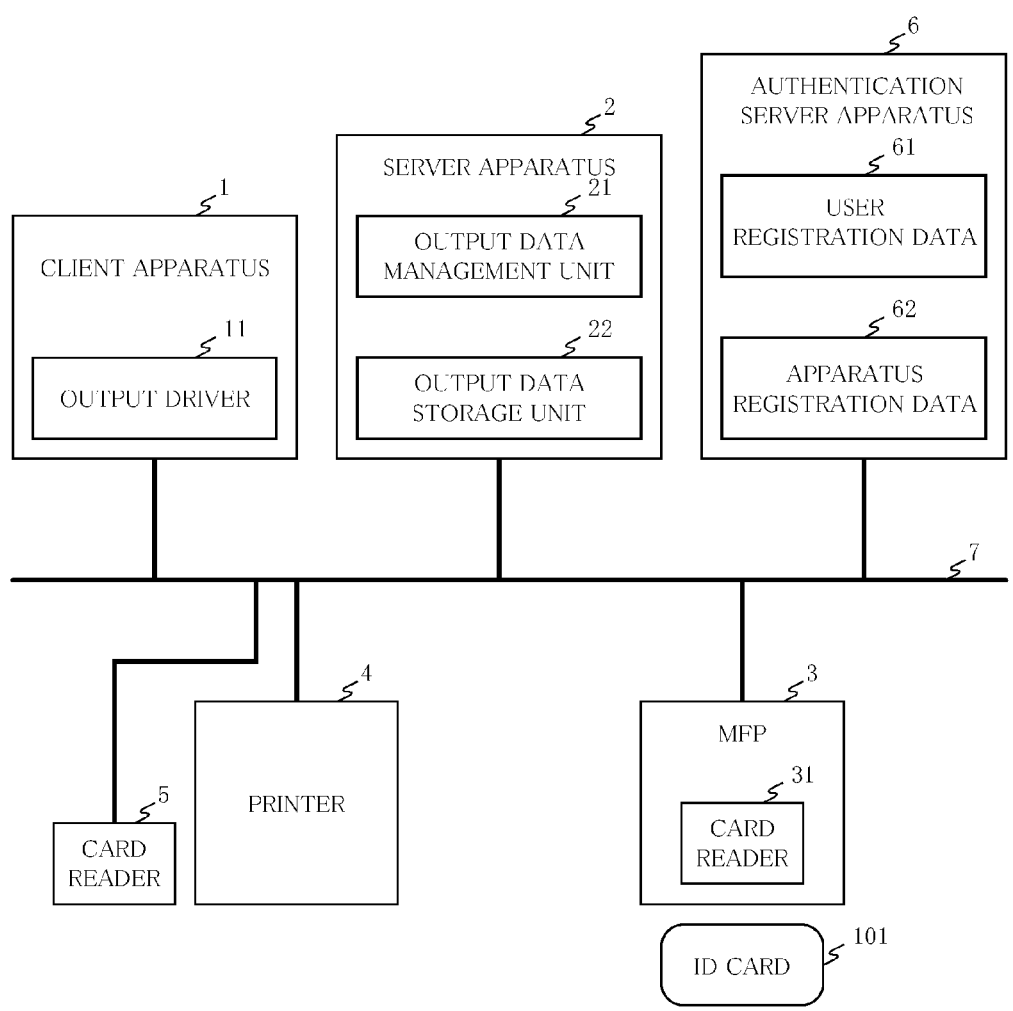
FIG. 1 is a block diagram illustrating the configuration of an image forming system according to a first embodiment of the present invention.

FIG. 1 is a block diagram illustrating the configuration of an image forming system according to a first embodiment of the present invention.

In the image forming system, a client apparatus 1, a server apparatus 2, a Multi Function peripheral (MFP) 3 (one example of an image forming apparatus), a printer 4 (another example of the image forming apparatus), a card reader 5 (example of an electronic apparatus), and an authentication server apparatus 6 are interconnected via a network 7. These components are assigned with respective identifiers (such as IP addresses and machine names) that can be uniquely specified on the network 7.

The client apparatus 1 is a terminal apparatus, such as a personal computer, which is operated by a user. The client apparatus 1 includes an output driver 11, such as a printer driver. The output driver 11 is a processing unit that generates image output data from document data. The document data is data that is generated by an application and stored as a data file. The image output data is print data that is, for example, described by using a page description language (PDL).

The server apparatus 2 is a computer apparatus connected to the network 7 and includes an output data management unit 21 (example of a data management unit) and an output data storage unit 22. The output data management unit 21 is a processing unit for storing the image output data, which is received from the client apparatus 1, in the output data storage unit 22.

The MFP 3 is an image forming apparatus for executing an image output process on the image output data. The image output process includes printing, facsimile transmission, copying, etc. The MFP 3 includes a card reader 31 (example of an acquisition unit). At the time of log-in, when a user's ID card 101 is placed near the card reader 31, the card reader 31 acquires, from the ID card 101, user authentication information that is specific to the user. The ID card is, for example, a smart card, having an integrated circuit embedded therein. The user authentication information is, for example, a user ID or an encrypted user ID. The MFP 3 transmits the user authentication information of the user to the server apparatus 2 and receives the image output data sent by the user from the client apparatus 1 to the server apparatus 2. The MFP 3 then executes the image output process of the received image output data.

The printer 4 is an image forming apparatus for printing the image output data received from the server apparatus 2 via the network 7. The card reader 5 is installed near the printer 4 and is pre-associated with the printer 4. When the ID card 101 of the user is placed near the card reader 5, the card reader 5 acquires, from the ID card 101, the user authentication information of the user, and then transmits the user authentication information to the server apparatus 2 via the network 7.

The authentication server apparatus 6 is a computer apparatus connected to the network 7 and includes user registration data 61 and apparatus registration data 62. The user registration data 61 contains user authentication information for registered users. The apparatus registration data 62 contains information representing the correspondence relation between the printer 4 and the card reader 5. Upon receiving a request for user authentication from the server apparatus 2, the authentication server apparatus 6 executes a user authentication process by referring to the user registration data 61, and then transmits the authentication result, as a response, to the server apparatus 2. Further, upon receiving regarding which image forming apparatus is related with the card reader 5, the authentication server apparatus 6 refers to the apparatus registration data 62 and transmits a response to the server apparatus 2 indicating that the image forming apparatus (that is, the printer 4 in this embodiment) is associated with the card reader 5. The authentication server apparatus 6 can be constituted, for example, by a computer apparatus on which an active directory server operates.

The network 7 is, for example, a wired and/or wireless LAN (Local Area Network).

The detailed configurations of the server apparatus 2 and the MFP 3 will be described below.

Figure 2:
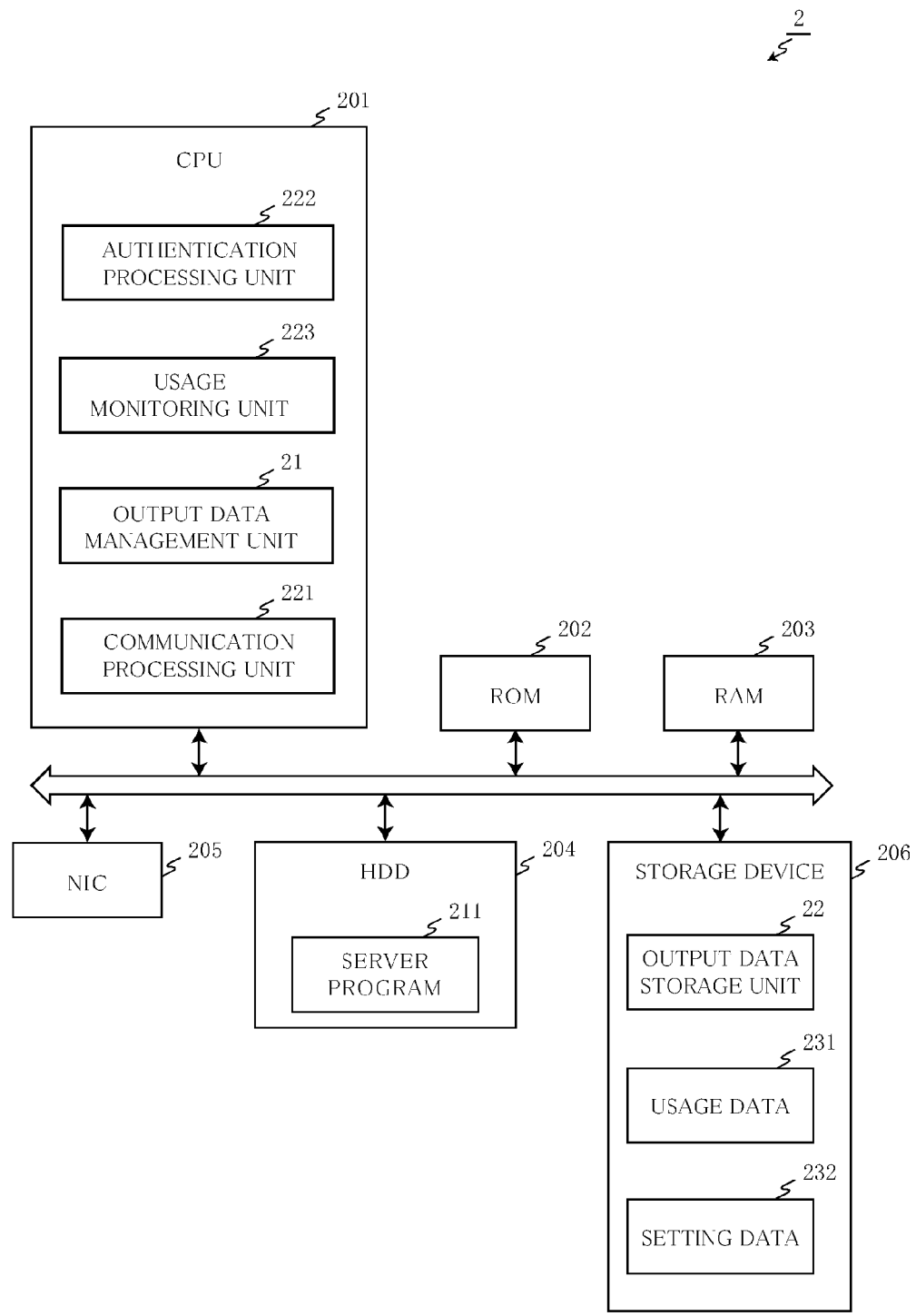
FIG. 2 is a block diagram illustrating the configuration of a server apparatus in FIG. 1.

FIG. 2 is a block diagram illustrating the configuration of the server apparatus 2 in FIG. 1.

A CPU (Central Processing Unit) 201 is an arithmetic and logic unit that executes a program, that is, executes processing described in a program. A ROM (Read Only Memory) 202 is a nonvolatile memory for storing programs and data in advance. A RAM (Random Access Memory) 203 is a memory for temporarily storing the program and data when a program is executed.

A HDD (Hard Disc Drive) 204 is a storage device having a recording medium to store an operating system (OS) (not illustrated), a server program 211, etc. In this first embodiment, an output data management unit 21, a communication processing unit 221, an authentication processing unit 222, and a usage monitoring unit 223 are realized with the server program 211 being executed by the CPU 201.

The communication processing unit 221 (example of a data reception unit or a data transmission unit) is a processing unit for controlling a Network Interface Card (NIC) 205 (example of a first communication device) and transmitting/receiving data in accordance with a communication protocol, such as TCP/IP (Transmission Control Protocol/Internet Protocol). The communication processing unit 221 receives the image output data through the NIC 205 and transmits the image output data to the MFP 3 and the printer 4 through the NIC 205.

The authentication processing unit 222 (example of an authentication processing unit) is a processing unit for receiving user authentication information input with a user operation from the card reader 5, which is associated with the MFP 3 or the printer 4 in advance, through the NIC 205 via the network 7 by using the communication processing unit 221. The authentication processing unit 222 also determines whether the received user authentication information is valid.

The usage monitoring unit 223 is a processing unit for monitoring an amount of usage (e.g. total number of pages) for various types of image output processes (such as color/monochrome printing, facsimile transmission, and/or color/monochrome copying), that are executed by the MFP 3 and the printer 4, per user or per work group to which the user belongs.

The NIC 205 is a communication device connected to the network 7.

A storage device 206 is a device for storing various types of data. A HDD, a nonvolatile semiconductor memory, or the like is employed as the storage device 206. A part of the storage device 206 is used as an output data storage unit 22. The storage device 206 stores usage data 231 and setting data 232. The usage data 231 contains the amount of the usage and an upper limit value of the amount of the usage for each of the various types of image output processes per user or per work group to which the user belongs. The setting data 232 is reference data that is referred to when the processing units, realized with the server program 211 being executed by the CPU 201, execute processing.

It should be noted that the usage data 231 and the setting data 232 may be stored in a storage device differing from the storage device 206. Further, while the output data storage unit 22 is present in the server apparatus 2 in the first embodiment, it may be present in an external device connected to the server apparatus 2 or may be present in a file server or database server connected to the network 7.

The CPU 201, ROM 202, RAM 203, HDD 204, NIC 205, and storage device 206 are interconnected via a bus, a controller, and an interface in a way capable of communicating data.

Figure 3:
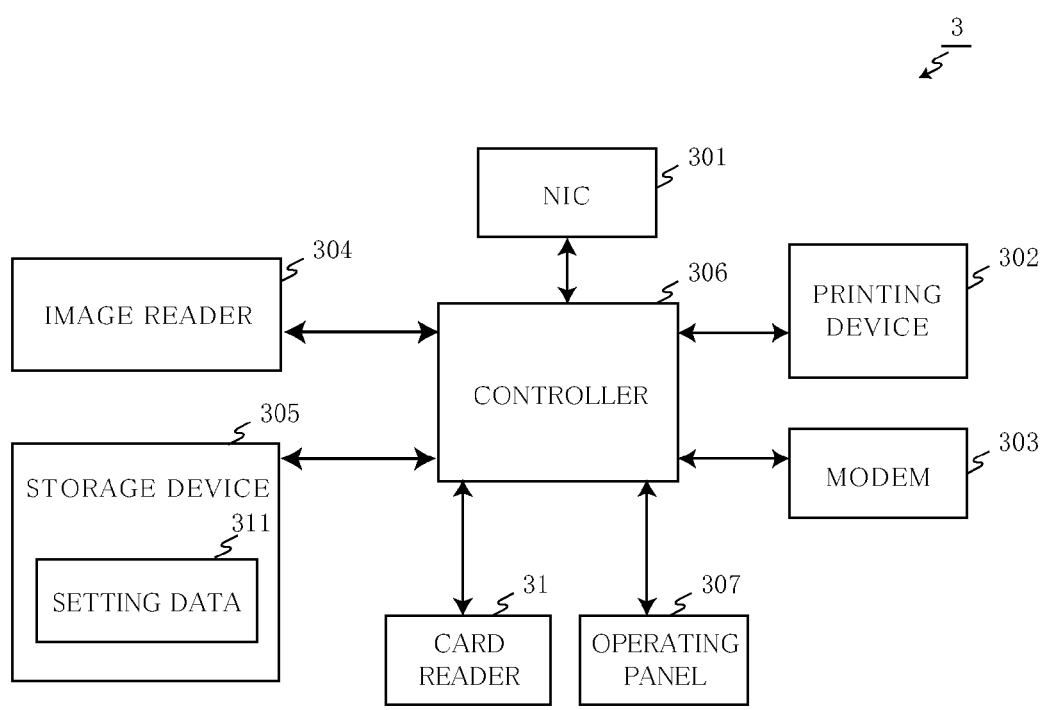
FIG. 3 is a block diagram illustrating the configuration of a Multi Function Peripheral (MFP) in FIG. 1.

FIG. 3 is a block diagram illustrating the configuration of the MFP 3 in FIG. 1.

The MFP 3 includes the card reader 31, the NIC 301 (example of a second communication device), a printing device 302, a modem 303, an image reader 304, a storage device 305, a controller 306 (example of a control unit), and an operating panel 307.

The NIC 301 is a communication device connected to the network 7.

The printing device 302 is a device that has a laser printing mechanism, for example, and which prints an image on a print sheet through the steps of forming a print image from the image output data, generating a control signal corresponding to the print image, and controlling the printing mechanism using the control signal.

The modem 303 is a device for forming a facsimile image from the image output data, generating facsimile data corresponding to the facsimile image, and transmitting the facsimile data. Further, upon receiving facsimile data, the modem 303 generates data of a facsimile image corresponding to the received facsimile data.

The image reader 304 is a device for optically reading a document image and generating image data of the document image.

The storage device 305 is a device for storing the setting data 311. A HDD, a nonvolatile semiconductor memory, or the like is suitably employed as the storage device 305. The setting data 311 is data that is referred to when processing is executed by the controller 306.

The controller 306 is a device for controlling the printing device 302, the modem 303, and the image reader 304 so as to execute the image output processes. Further, the controller 306 executes a process of transmitting the user authentication information, which is acquired by the card reader 31, to the server apparatus 2 through the NIC 301, and receiving the image output data from the server apparatus 2 through the NIC 301. The controller 306 is realized, for example, with a control program being executed by a microprocessor. The controller 306 may also execute the processes of forming the print image and generating the facsimile data.

The operating panel 307 includes a display device and an input device and serves as a user interface of the MFP 3. For example, the display device may be provided as a liquid crystal display, and the input device may comprise a touch panel and a plurality of hard keys.

The operation of each component in the above-described image forming system will be described below.

A description is first made for a process of causing the image forming apparatus, including the card reader, to execute a job.

Figure 4:
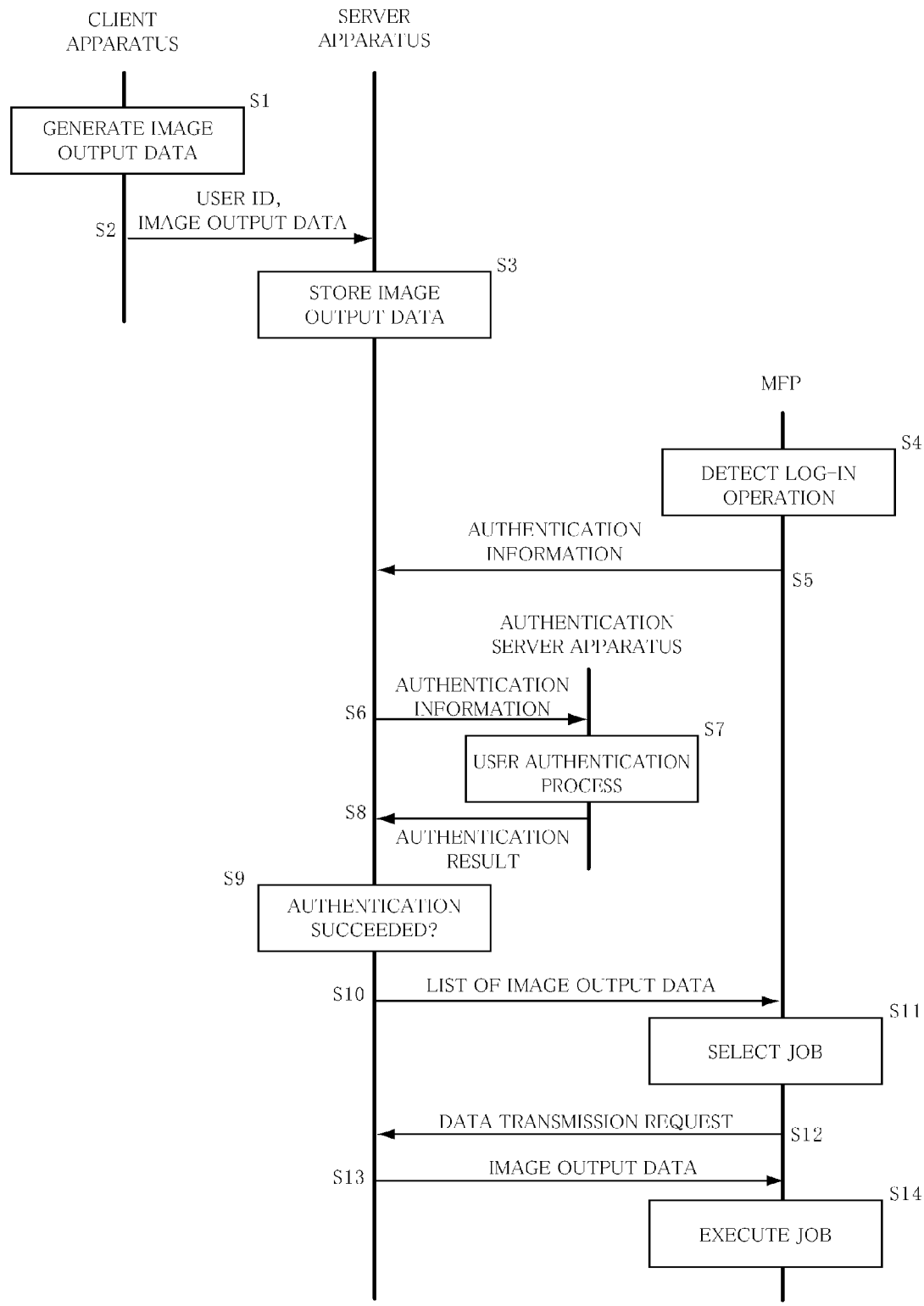
FIG. 4 is a sequence chart to explain a process of causing the MFP to execute a job in the image forming system illustrated in FIG. 1 or FIG. 10.

FIG. 4 is a sequence chart to explain a process of causing the MFP 3 to execute a job in the image forming system illustrated in FIG. 1.

In the client apparatus 1, the user starts up the output driver 11 through an application (not illustrated). The output driver 11 generates image output data corresponding to document data (step S1) and transmits the image output data to the server apparatus 2 through a NIC (not illustrated) (step S2). At that time, the user authentication information of the user is also transmitted together with the image output data.

It should be noted that identification (ID) information associated with the user authentication information may be transmitted together with the image output data.

The transmitted image output data is received by the server apparatus 2. In the server apparatus 2, the transmitted image output data is received by the communication processing unit 221 through the NIC 205. The output data management unit 21 stores the received image output data in the output data storage unit 22 in correlation with the user authentication information (step S3).

The image output data is temporarily held in the server apparatus 2.

The user goes to the installation place of the MFP 3 and performs a log-in operation. In this first embodiment, the user performs the log-in operation by placing the ID card 101, which is uniquely assigned to the user, over the card reader 31 of the MFP 3. Upon detecting the ID card 101 placed near the card reader 31, the card reader 31 acquires the user authentication information from the ID card 101 (step S4).

After the user authentication information has been acquired by the card reader 31, the controller 306 transmits a user authentication request and the user authentication information to the server apparatus 2 through the NIC 301 (step S5).

The user authentication request and the user authentication information are received by the server apparatus 2. In the server apparatus 2, the communication processing unit 221 receives the user authentication request and the user authentication information through the NIC 205. After the user authentication request and the user authentication information have been received, the authentication processing unit 222 transmits the received user authentication request and the user authentication information to the authentication server apparatus 6 via the network 7 (step S6).

Upon receiving the user authentication request and the user authentication information, the authentication server apparatus 6 refers to the user registration data 61 and determines whether the received user authentication information is valid (step S7). Then, the authentication server apparatus 6 transmits that authentication result, as a response, to the server apparatus 2 (step S8).

The communication processing unit 221 of the server apparatus 2 receives the authentication result through the NIC 205 via the network 7, and transmits the authentication result to the authentication processing unit 222. The authentication processing unit 222 determines, based on the received authentication result, whether the user authentication information from the MFP 3 is valid (step S9).

If the authentication processing unit 222 determines that the user authentication information from the MFP 3 is valid, the output data management unit 21 acquires, from among all the image output data stored in the output data storage unit 22, a list of the image output data related with the valid user authentication information. The authentication processing unit 222 causes the communication processing unit 221 to transmit the list to the MFP 3 (step S10). The communication processing unit 221 transmits the acquired list to the MFP 3 through the NIC 205 via the network 7.

If the authentication processing unit 222 determines that the user authentication information from the MFP 3 is invalid, the authentication processing unit 222 causes the communication processing unit 221 to transmit only the authentication result to the MFP 3.

If the user authentication information from MFP 3 has been validated, the controller 306 of the MFP 3 receives the list of the image output data associated with the user authentication information through the NIC 205 and displays the list on the display device of the operating panel 307.

FIG. 5 illustrates an example of a screen displaying the list of the image output data in the first embodiment. The list includes the columns of "user ID", "save date into server", "total number of pages", and "thumbnail image". The "user ID" is identification (ID) information related with a part of the user authentication information or other ID information related with the user authentication information. The "save date into server" is the date (day and time) when the image output data was stored into the server apparatus 2. The output data management unit 21 of the server apparatus 2 generates thumbnail image data in a top page of the image output data and adds the generated thumbnail image data to the list. The "thumbnail image" illustrated in FIG. 5 is displayed by the added thumbnail image data.

When a select operation is made by the user through the input device of the operating panel 307, the controller 306 selects the image output data from the list using the select operation, and transmits a request for the selected image output data to the server apparatus 2 through the NIC 301 (step S12). In the case of the list illustrated in FIG. 5, for example, the selected image output data is specified by the "serial number" or the "save date into server" entry.

Upon the request being received by the communication processing unit 221 in the server apparatus 2, the output data management unit 21 acquires the requested image output data and causes the communication processing unit 221 to transmit the acquired image output data to the MFP 3 (step S13).

The image output data may remain stored in the output data storage unit 22 to be ready for, for example, reuse in printing. Alternatively, after the image output data has been transmitted, the output data management unit 21 may delete the image output data from the output data storage unit 22. Also, after the image output data has been transmitted, the output data management unit 21 may automatically delete the image output data from the output data storage unit 22 after the lapse of a predetermined period.

The controller 306 of the MFP 3 receives the image output data through the NIC 301 and executes the image output process selected by the user through the operating panel 307 (step S14). For example, when the printing button is depressed on the screen illustrated in FIG. 5, the image output data is printed by using the printing device 302. When a facsimile transmission button is depressed, facsimile transmission of the image output data is executed by using the modem 303.

If the user authentication has been validated, the authentication processing unit 222 generates a session ID that is specific to the session, and the communication processing unit 221 transmits the generated session ID to the MFP 3 together with the list. After adding the session ID to the transmission request for the image output data, the controller 306 of the MFP 3 transmits the transmission request for the image output data to the server apparatus 2.

The following description is made for the case of a card reader provided separately from an image forming apparatus, for causing the image forming apparatus to execute a job.

Figure 6:
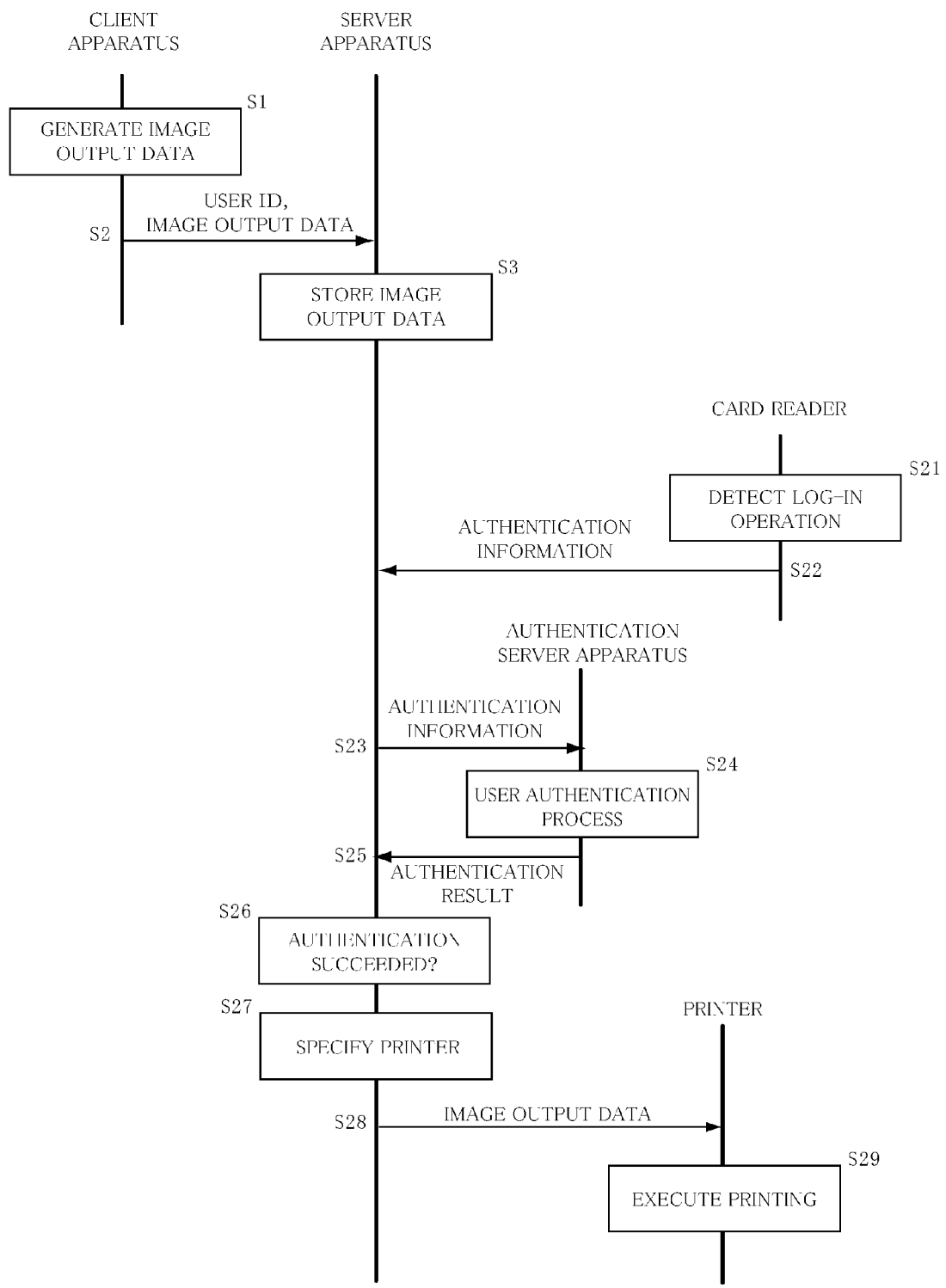
FIG. 6 is a sequence chart to explain a process of causing a printer to execute printing in the image forming system illustrated in FIG. 1 or FIG. 10.

FIG. 6 is a sequence chart to explain a process of causing the printer 4 to execute printing in the image forming system illustrated in FIG. 1.

Similarly to the case of causing the MFP 3 to execute the image forming process, image output data is transferred from the client apparatus 1 to the server apparatus 2 and is stored in the server apparatus 2 (steps S1 to S3).

When the printer 4 is used to execute printing, the user goes to the installation place of the card reader 5 associated with the printer 4, and performs a log-in operation. The user performs the log-in operation by placing the ID card 101, which is uniquely assigned to the user, over the card reader 5. Upon detecting the ID card 101 placed near the card reader 5, the card reader 5 acquires the user authentication information from the ID card 101 (step S21) and transmits the user authentication information to the server apparatus 2 via the network 7 (step S22).

The user authentication information is received by the server apparatus 2. In the server apparatus 2, the communication processing unit 221 receives the user authentication information through the NIC 205. After the user authentication information acquired by the card reader 5 has been received, the authentication processing unit 222 transmits a user authentication request and the user authentication information to the authentication server apparatus 6 via the network 7 (step S23).

Upon receiving the transmitted user authentication request and user authentication information, the authentication server apparatus 6 refers to the user registration data 61 and determines whether the received user authentication information is valid (step S24). Then, the authentication server apparatus 6 transmits that authentication result, as a response, to the server apparatus 2 (step S25).

The communication processing unit 221 of the server apparatus 2 receives the authentication result through the NIC 205 via the network 7, and transmits the authentication result to the authentication processing unit 222. The authentication processing unit 222 determines, using the received authentication result, whether the user authentication information transmitted from the card reader 5 is valid (step S26).

If the authentication processing unit 222 determines that the user authentication information transmitted from the card reader 5 is valid, the authentication processing unit 222 transmits to the authentication server apparatus 6 a request for inquiring about the image forming apparatus associated with the card reader 5 and receives a response back from the authentication server apparatus 6. The authentication processing unit 222 specifies, in the received response, the image forming apparatus (that is, the printer 4 in this embodiment), which is a transmission destination of the image output data (step S27). Upon receiving the request, the authentication server apparatus 6 refers to the apparatus registration data 62, specifies the image forming apparatus related with the card reader 5, and transmits the response indicating the specified image forming apparatus to the server apparatus 2.

The output data management unit 21 acquires image data (one or more) among all the image output data stored in the output data storage unit 22, which are associated with the valid user authentication information. The authentication processing unit 222 causes the communication processing unit 221 to transmit the acquired image output data to the specified image forming apparatus (that is, the printer 4 in this embodiment) (step S28). The communication processing unit 221 transmits those image output data to the printer 4 through the NIC 205 via the network 7.

If the authentication processing unit 222 determines that the user authentication information transmitted from the card reader 5 is invalid, the current session is brought to an end.

If the user authentication information transmitted from the card reader 5 has been validated, the printer 4 receives and prints those image output data (step S29).

Accordingly, the user can instruct various types of image output processes (such as printing and FAX transmission) to be performed on the plurality of image output data while preventing leakage of secrets, thereby providing more security.

<Second Embodiment>

An image forming system according to a second embodiment of the present invention has the same configurations as that of the image forming system according to the first embodiment. In the image forming system according to the second embodiment, the user authentication is required only for part of several image output processes, such as printing and facsimile transmission, in a similar manner to that in the first embodiment before the process is executed. The remaining one or more image output processes are immediately executed without requesting the user authentication.

The output driver 11 of the client apparatus 1 specifies the image output process, which is to be executed on the image output data, by a user operation, for example, and transmits the specification of the image output process to the server apparatus 2 with the image output data. When an image output process that does not require user authentication is specified, the image forming apparatus (for example, the MFP 3) to be used in processing the image output data is also specified, and the specification is also transmitted to the server apparatus 2.

When a predetermined image output process (for example, a facsimile transmission) is specified, the output data management unit 21 of the server apparatus 2 causes the communication processing unit 221 to immediately transmit the image output data to the specified image forming apparatus. In the case of the predetermined image output process (for example, facsimile transmission), the communication processing unit 221 transmits the image output data to the specified image forming apparatus (for example, the MFP 3) through the NIC 205 without waiting for the user authentication executed by the authentication processing unit 222.

In the second embodiment, for the predetermined image output process, the controller 306 of the MFP 3 receives the image output data from the server apparatus 2 without a determination as to whether the user authentication information is valid, and instructs the image output process to be executed for the received image output data.

When the other image output process (for example, printing) is specified in the client apparatus 1, the image output data is processed in the same manner as in the first embodiment.

Accordingly, when the possibility of secret leakage is low for executing the image output process, the image output process can be executed without determining whether the user authentication information is valid. As a result, the time required for a needless user authentication process is cut.

A first authentication method is hereinafter referred to as "single authentication", which enables part of the image output processes to be executed without requesting the user authentication. A second authentication method is hereinafter referred to as "full authentication", which always requests the user authentication to be executed for all of the image output processes.

It should be noted that the server apparatus 2 and the MFP 3 may be set to be able to select either the single authentication or the full authentication.

<Third Embodiment>

An image forming system according to a third embodiment of the present invention has the same configurations as that of the image forming systems according to either the first embodiment or second embodiment. In the image forming system according to the third embodiment, the MFP 3 manages an amount of usage per user or per work group to which the user belongs.

When the setting data 311 does not store usage limit information indicating that the amount of usage is unlimited, the controller 306 of the MFP 3 transmits a request for the usage limit information associated with the user authentication information, to the server apparatus 2 through the NIC 301, and receives the usage limit information through the NIC 301. When the received usage limit information indicates that the usage is unlimited, the usage limit information is stored in the setting data 311.

If the user authentication information is valid, the usage monitoring unit 223 of the server apparatus 2 acquires, from the usage data 231, the usage limit information associated with the user authentication information, upon receiving the request for the usage limit information. The communication processing unit 221 transmits the usage limit information to the MFP 3. The usage limit information includes a value of the accumulated amount of usage (for example, total number of pages printed) for each of items (that is, various types of image output processes such as color/monochrome printing, facsimile transmission, and/or color/monochrome copying), and an upper limit value for each of those items per user or per work group to which the user belongs. When the amount of usage is unlimited, the upper limit value is set to zero in advance.

Figure 7:
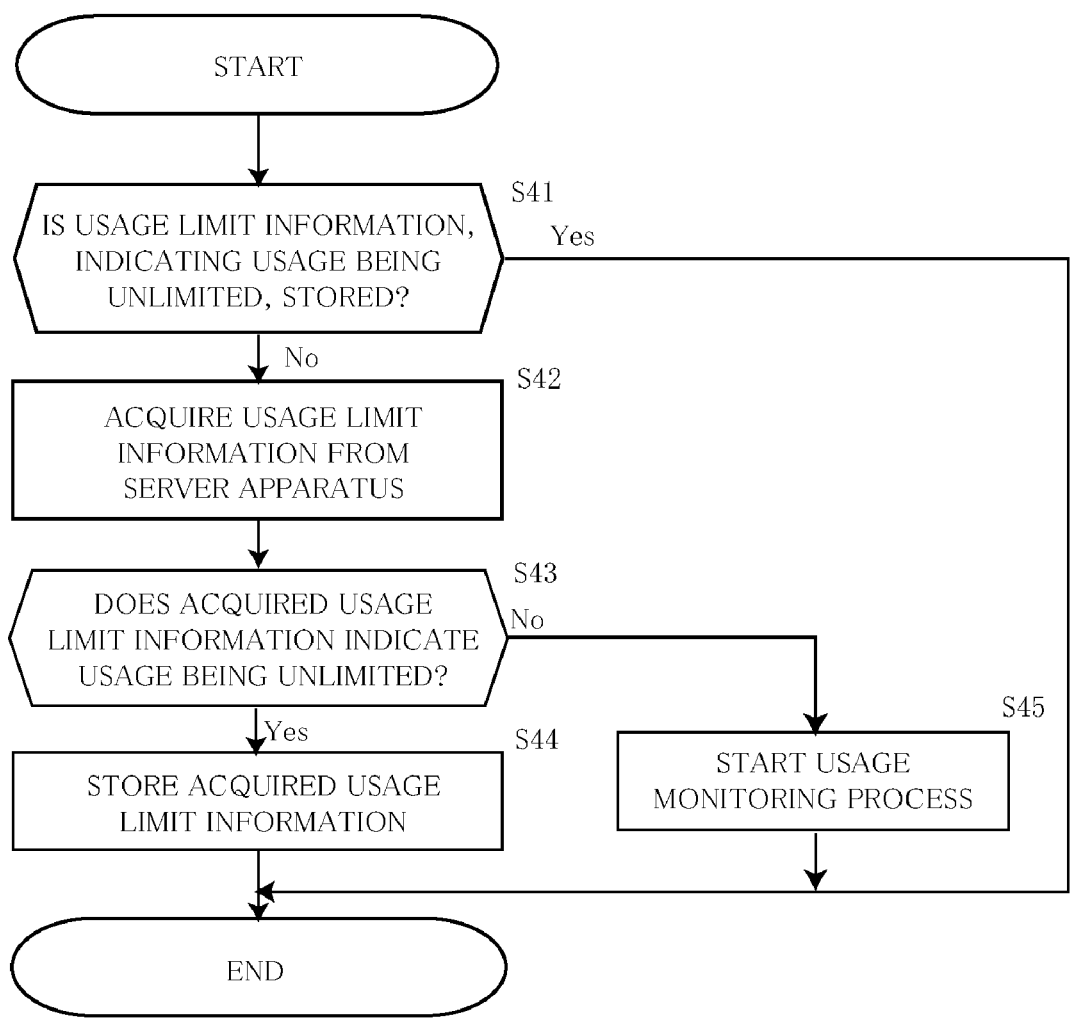
FIG. 7 is a flowchart to explain a usage management process of the MFP in a third embodiment.

FIG. 7 is a flowchart to explain a usage management process of the MFP 3 according to the third embodiment.

When the user performs the log-in operation on the MFP 3 and the user authentication made by the server apparatus 2 succeeds, the controller 306 determines whether the setting data 311 stored for the user indicates that the usage limit information is unlimited (step S41).

If the setting data 311 does not store usage limit information indicating that the amount of usage is unlimited, the controller 306 transmits the request for the usage limit information to the server apparatus 2, and receives the usage limit information in a response from the server apparatus 2 (step S42).

From this response, the controller 306 determines whether the received usage limit information indicates that the amount of usage is unlimited (step S43).

If it is determined that the received usage limit information indicates that the amount of usage is unlimited, the controller 306 stores the received usage limit information in the setting data 311 (step S44).

On the other hand, if it is determined that the received usage limit information does not indicate that the amount of usage is unlimited, the controller 306 starts a usage monitoring process (step S45). In the usage monitoring step, whenever the image output process is executed, the amount of usage is accumulatively counted for the item corresponding to the executed image output process. It is determined whether the accumulated usage has reached the upper limit value. If the value of the usage has reached the upper limit value, the execution of the image output process corresponding to the item is inhibited.

In step S41, if it is determined that the setting data 311 stores usage limit information indicating that the amount of usage is unlimited, the controller 306 does not receive the usage limit information from the server apparatus 2.

Further, if it is determined that the setting data 311 stores usage limit information indicating that the amount of usage is unlimited in step S41, and if it is determined that the usage limit information received indicates that the usage is unlimited in step S43, the amount of usage for the item corresponding to the image output process is accumulatively counted when the process is executed, but whether the amount of usage has reached the upper limit value is not determined.

When the user logs out, the controller 306 transmits the amount of the usage to the server apparatus 2 with the user authentication information or the session ID through the NIC 301. In the server apparatus 2, the communication processing unit 221 receives the transmitted amount of the usage, and the usage monitoring unit 223 updates the amount of the usage in the usage limit information with the received amount of the usage per user or per work group to which the user belongs.

Accordingly, when the amount of usage is unlimited, the use of the MFP 3 is not inhibited according to the amount of usage. Therefore, it is not required to monitor the amount of usage in real time. Thus, when the amount of usage is unlimited in the image forming apparatus such as the MFP 3, this information is stored when received, and a next request for the usage limit information is omitted. As a result, the time required for the user log-in process is cut.

<Fourth Embodiment>

An image forming system according to a fourth embodiment of the present invention has the same configurations as that of the image forming system according to one of the first to third embodiments. In the image forming system according to the fourth embodiment, the MFP 3 displays an error message when the down state of the server apparatus 2 is detected.

In the fourth embodiment, the controller 306 of the MFP 3 accesses the server apparatus 2, which is set by default, through the NIC 301 at the startup. If there is no response from the server apparatus 2 within a certain period, the controller 306 displays an error message on the display device of the operating panel 307. FIG. 8 illustrates one example of a screen displaying the error message in the fourth embodiment.

When some process is selected as the next process by the user, the controller 306 executes the selected process.

In the case illustrated in FIG. 8, for example, one of "server setting", "selection of alternate server", and "end" is selected as the next process.

When "server setting" is selected, a setting screen (for example, a popup screen) for indicating a server apparatus is displayed. The user can indicate another server apparatus on the displayed setting screen.

When "selection of alternate server" is selected, a list of substitutable servers, which are registered in the setting data 311 in advance, is displayed. One of the substitutable servers is selected by a user operation to be used instead of the server apparatus 2.

When "end" is selected, the controller 306 stops the startup process.

The next processes displayed in the error message are not limited to the above-mentioned examples. If "reconnect later" (not illustrated) is selected, the controller 306 may retry access to the server apparatus 2 after the lapse of a predetermined time (for example, 3 minutes).

The remaining processes in the fourth embodiment are the same as those in each of the first to third embodiments.

Accordingly, the user is able to ascertain the down state of the server apparatus 2 and to easily make an appropriate setting to cope with the down state.

<Fifth Embodiment>

An image forming system according to a fifth embodiment of the present invention has the same configurations as that of the image forming system according to each of the first to fourth embodiments. In the image forming system according to the fifth embodiment, the server apparatus 2 determines whether an authentication method set in the MFP 3 is compatible with a relay processing method set in the server apparatus 2.

The MFP 3 stores, in the setting data 311, a user authentication setting to specify an on/off condition for the user authentication and the user authentication method in the MFP 3. At the startup, the controller 306 transmits the user authentication setting to the server apparatus 2.

The server apparatus 2 stores, in the setting data 232, a relay process setting to specify a relay process condition of the image output data, which is to be executed by the server apparatus 2, from among a plurality of predetermined relay processing methods. Upon receiving the user authentication setting from the MFP 3, the authentication processing unit 222 determines whether the received user authentication setting is compatible with the relay processing methods. The communication processing unit 221 transmits the determination result to the controller 306 of the MFP 3.

Further, the server apparatus 2 stores, in the setting data 232, compatibility data that indicates whether combinations of the user authentication setting of the MFP 3 and the relay processing setting of the server apparatus 2 are compatible.

It should be noted that the compatibility data may be prepared separately for each of a plurality of image forming apparatuses, such as the MFP 3 and the printer 4, or may be prepared in common to the plurality of image forming apparatuses.

FIG. 9 is a table illustrating one example of the compatibility data in the fifth embodiment.

In the MFP 3, the user authentication setting is set to one of "authentication off", "local authentication", "network authentication", and "intermediary server authentication".

In the case of "authentication off", the user can use the MFP 3 without user authentication.

In the case of "local authentication", the controller 306 refers to the user registration data stored in the MFP3 and determines whether the user authentication information transmitted from the card reader 31 is valid.

In the case of "network authentication", the controller 306 directly transmits a request for user authentication to the authentication server apparatus 6, and receives the result of the user authentication from the authentication server apparatus 6. Then, the controller 306 determines, by the received result of the user authentication, whether the user authentication information transmitted from the card reader 31 is valid.

In the case of "intermediary server authentication", the controller 306 transmits the user authentication information transmitted from the card reader 31 to the server apparatus 2. Then, the user authentication is executed in the server apparatus 2 as in the first embodiment.

On the other hand, in the server apparatus 2 according to the fifth embodiment, the relay processing setting is set to one of "transfer printing", "dam printing", "job selective printing under single authentication", and "job selective printing under full authentication", as illustrated in FIG. 9.

The item "transfer printing" implies a processing method in which, upon receiving the image output data from the client apparatus 1, the server apparatus 2 immediately transmits the received image output data to the specified image forming apparatus without holding the image output data.

The item "dam printing" implies a processing method in which, if the user authentication has been validated, all the image output data related with the user authentication information are transmitted to the image forming apparatus.

The item "job selective printing under single authentication" and the item "job selective printing under full authentication" are described in the second embodiment. The term "job selective printing" implies that the image output data can be selected and the type of the image output process can be selected.

According to the compatibility data illustrated in FIG. 9, the only user authentication setting in the MFP 3 that is compatible with the relay processing setting "transfer printing" in the server apparatus 2 is "authentication off". The only user authentication setting in the MFP 3 that is compatible with the relay processing settings "job selective printing under single authentication" and "job selective printing under full authentication" in the server apparatus 2 is "intermediary server authentication".

If the user authentication setting transmitted from the MFP 3 represents "local authentication" and the relay processing setting represents "job selective printing under full authentication", the authentication processing unit 222 determines that the user authentication setting is incompatible. The communication processing unit 221 transmits the determination result to the controller 306 of the MFP 3.

The controller 306 of the MFP 3 receives the determination result. If the user authentication setting is incompatible, the controller 306 causes the display device of the operating panel 307 to display, for example, an error message indicating the incompatibility.

If the user authentication setting is incompatible, the authentication processing unit 222 of the server apparatus 2 may transmit the compatibility data to the MFP 3 together with the determination result.

It should be noted that, if the user authentication setting is incompatible with the relay processing setting, the controller 306 of the MFP 3 may change the user authentication setting to be compatible with the relay processing setting by referring to the transmitted compatibility data.

Further, it should be noted that, if the user authentication setting is incompatible, the authentication processing unit 222 of the server apparatus 2 may change the relay processing setting to be compatible with the user authentication setting such that the user authentication setting becomes compatible. For example, when the relay processing setting is "dam printing" and the user authentication setting is "intermediary server authentication", the authentication processing unit 222 determines that the user authentication setting is incompatible. In that case, the authentication processing unit 222 changes the user authentication setting from "dam printing" to "job selective printing under full authentication", and then determines that the user authentication setting is compatible with the relay processing setting.

The remaining processes in the fifth embodiment are the same as those in each of the first to fourth embodiments.

Accordingly, the MFP 3 can detect, prior to actually executing the printing process, whether the user authentication will fail due to the incompatibility determined by the authentication method.

<Sixth Embodiment>

An image forming system according to a sixth embodiment of the present invention has the same configurations as that of the image forming system according to each of the first to fifth embodiments. In the image forming system according to the sixth embodiment, a request for an image forming process to the MFP 3 without passing the server apparatus 2 is inhibited.

In the sixth embodiment, when image output data is transmitted to the MFP 3 via the network 7 from other apparatus (for example, an image forming apparatus or a client apparatus or a server apparatus), then the server apparatus 2, the NIC 301 or the controller 306 does not receive the transmitted image output data.

For example, when the IP address of an apparatus that transmits the image output data is different from that of the server apparatus 2, the controller 306 does not receive that image output data.

It should be noted that the server apparatus 2 may add a session ID to the image output data, and the controller 306 may delete the image output data if the session ID is not added after temporarily receiving the image output data.

Similar processing can be executed in the printer 4 as well as in the MFP3.

The remaining processes in the sixth embodiment are the same as those in each of the first to fifth embodiments.

Accordingly, an image output process, such as printing, cannot be executed unless the user authentication is valid. This allows for better prevention of secret leakage from the MFP 3 and the printer 4.

<Seventh Embodiment>

An image forming system according to a seventh embodiment of the present invention has the same configurations as that of the image forming system according to each of the first to fifth embodiments. In the image forming system according to the seventh embodiment, the controller 306 of the MFP 3 inhibits utilization of part of the functions of the MFP 3 for image output data received from an apparatus other than the server apparatus 2.

For example, the controller 306 of the MFP 3 inhibits utilization of high-performance functions of the MFP 3, such as color printing, high-resolution printing, and high-speed printing, for image output data received from an apparatus other than the server apparatus 2.

It should be noted that the controller 306 of the MFP 3 may instruct printing of a low-quality image for the image output data received from an apparatus other than the server apparatus 2, by reducing the resolution or the image density, for example.

The remaining processes in the seventh embodiment are the same as those in each of the first to fifth embodiments.

Accordingly, since utilization of the high-performance functions of the MFP 3, such as color printing, high-resolution printing, and high-speed printing, is inhibited for the image output data received from an apparatus other than the server apparatus 2, a user will be more motivated to try to employ the server apparatus 2 and which further prevents secret leakage.

<Eighth Embodiment>

An image forming system according to an eighth embodiment of the present invention has the same configurations as that of the image forming system according to each of the first to fifth embodiments. In the image forming system according to the eighth embodiment, image output data transmitted from an apparatus other than the server apparatus 2 to the MFP 3 is transferred from the MFP 3 to the server apparatus 2.

Upon receiving image output data from an apparatus other than the server apparatus 2, the controller 306 of the MFP 3 transfers the received image output data to the server apparatus 2. The communication processing unit 221 of the server apparatus 2 receives the transferred image output data through the NIC 205, and the output data management unit 21 stores the received image output data in the output data storage unit 22. Thus, the image output process of the image output data is not immediately executed, and the image output data is stored in the server apparatus 2.

It should be noted that the output data management unit 21 of the server apparatus 2 may store the transferred image output data in the output data storage unit 22 in correlation with the user authentication information for a predetermined user (for example, an administrator). This enables the administrator to monitor the image output data that will be printed without passing the server apparatus 2.

Further, it should be noted that, after the user authentication has succeeded, the controller 306 of the MFP 3, to which the user has logged in, may operate as follows. The controller 306 receives, from the server apparatus 2, a list of a plurality of image output data stored in the server apparatus 2. When the image output data assigned to the user is selected from the list, the controller 306 receives the selected image output data from the server apparatus 2 and executes the image output process for the received image output data.

Similar processing can be executed in the printer 4 as well as the MFP 3.

The remaining processes in the eighth embodiment are the same as those in each of the first to fifth embodiments.

Accordingly, since the image forming apparatus cannot be used without passing the server apparatus 2, prevention of secret leakage from the MFP 3 and the printer 4 can be at a higher level.

<Ninth Embodiment>

In a ninth embodiment, the image forming apparatuses, such as the MFP 3 and the printer 4, in the first embodiment, are classified into one or more apparatus groups, and an output driver adapted for each of the apparatus groups is employed in the client apparatus. That is, the output driver and the apparatus group including one or more image forming apparatuses, which are adapted for the output driver, are associated with each other in advance.

Figure 10:
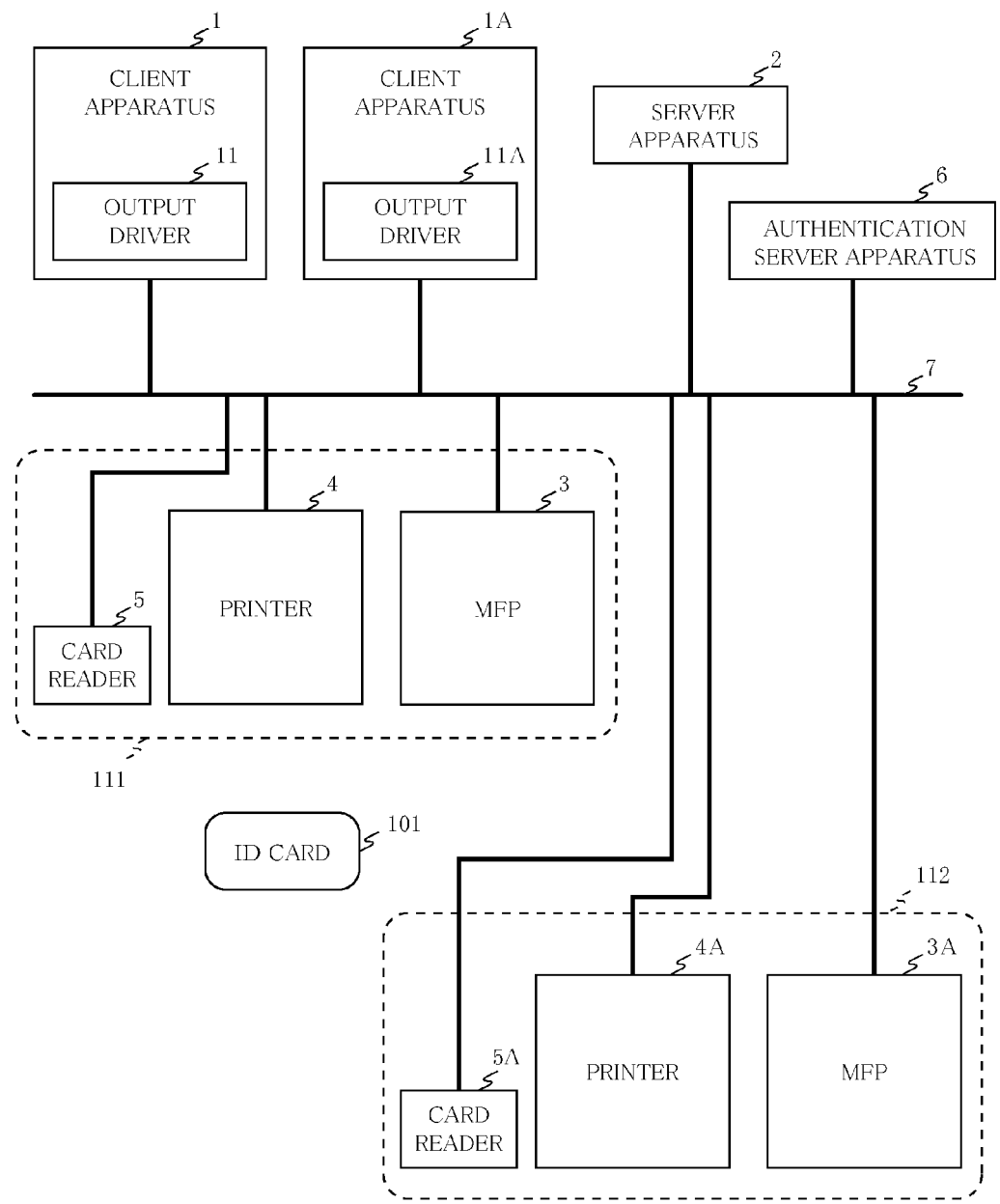
FIG. 10 is a block diagram illustrating the configuration of an image forming system according to a ninth embodiment.

FIG. 10 is a block diagram illustrating the configuration of an image forming system according to the ninth embodiment. The configuration illustrated in FIG. 10 includes, in addition to the configuration illustrated in FIG. 1, a client apparatus 1A, an MFP 3A, a printer 4A, and a card reader 5A. Similarly to the configuration of FIG. 1, the server apparatus 2 includes the output data management unit 21 and the output data storage unit 22 (not illustrated). Also, similarly to the configuration of FIG. 1, the authentication server apparatus 6 includes the user registration data 61 and the apparatus registration data 62 (not illustrated).

The client apparatus 1A is an apparatus having the same configuration as that of the client apparatus 1, but it includes an output driver 11A differing from the output driver 11. The output driver 11A is a processing unit that generates image output data from document data. The output driver 11A generates the image output data in a data format differing from that of the image output data generated by the output driver 11.

It should be noted that each of the output drivers 11 and 11A may have output driver ID information depending on the driver type. In data communication with the server apparatus 2, each of the output drivers 11 and 11A may transmit the output driver ID information together with data.

The MFP 3A is an apparatus having the same configuration as that of the MFP 3. However, the data format of image output data used in an image forming process executed in the MFP 3A differs from that in the MFP 3.

The printer 4A is an apparatus having the same configuration as that of the printer 4. However, the data format of image output data used in an image forming process executed in the printer 4A differs from that in the printer 4. The card reader 5A is an electronic apparatus, which has the same configuration as that of the card reader 5 and which is associated with the printer 4A in advance.

The MFP 3 and the printer 4, which have image output data in a first common data format [for example, XPS (XML Paper Specification) or PDF] in image output processes, belong to an apparatus group 111. The MFP 3A and the printer 4A, which have image output data in a second common data format in image output processes belong to an apparatus group 112. Apparatus groups 111 and 112 are associated with respective apparatus group ID information. Also, the MFPs 3 and 3A, the printers 4 and 4A, and the card readers 5 and 5A are associated with apparatus ID information.

The server apparatus 2 stores an apparatus group table in the storage device 206. The apparatus group table contains the apparatus group ID information for the apparatus group, and the output driver ID information of the output driver for transmitting the image output data of the common data format used by the image forming apparatuses belonging to that apparatus group. Further, the apparatus group table contains the apparatus group ID information of the apparatus group and the apparatus ID information of the image forming apparatus which belongs to the apparatus group. In data communication with the server apparatus 2, each of the MFPs 3 and 3A and the card readers 5 and 5A transmits the apparatus ID information together with data.

It should be noted that the apparatus ID information may be an identifier that can be uniquely specified in the network 7.

Further, it should be noted that the apparatus group ID information may be used as the output driver ID information.

In the configuration illustrated in FIG. 10, the server apparatus 2 operates as follows.

Similarly to the steps S1 to S3 in FIG. 4, the output driver 11 of the client apparatus 1 or the output driver 11A of the client apparatus 1A generates image output data corresponding to document data (step S1). The output driver 11 transmits the generated image output data to the server apparatus 2 through the NIC (not illustrated) (step S2). At that time, the user authentication information of the user is also transmitted together with the image output data.

It should be noted that other ID information related with the user authentication information is transmitted together with the image output data.

Further, the output driver ID information is transmitted together with the image output data. The image output data and the output driver ID information are received by the server apparatus 2.

In the server apparatus 2, the communication processing unit 221 receives the image output data and the output driver ID information through the NIC 205. The output data management unit 21 refers to the apparatus group table, and specifies the apparatus group ID information associated with the received output driver ID information. The output data management unit 21 stores the received image output data in the output data storage unit 22 associated with both the apparatus group ID information and the user authentication information (step S3).

As a result, the image output data is temporarily stored in the server apparatus 2 associated with the apparatus group ID information.

Thereafter, the user performs the log-in operation from one of the MFPs 3 and 3A, which transmits the user authentication information to the server apparatus 2. The authentication processing unit 222 of the server apparatus 2 executes the user authentication process. If it is determined that the transmitted user authentication information is valid, the output data management unit 21 of the server apparatus 2 refers to the apparatus group table and specifies the apparatus group ID information associated with the apparatus ID information of the apparatus (that is, one of the MFPs 3 and 3A) for which the log-in operation was performed. The output data management unit 21 acquires, from among all the image output data stored in the output data storage unit 22, a list of those image output data that are related with not only the apparatus group ID information, but also with the user authentication information. The output data management unit 21 instructs the communication processing unit 221 to transmit the acquired list to the apparatus for which the log-in operation was performed (step S10). The communication processing unit 221 transmits, through the NIC 205 via the network 7, the acquired list to the apparatus through the log-in operation. Then, steps S11 to S14 are executed by both the server apparatus 2 and the apparatus for which the log-in operation was performed.

Similarly to the sequence chart illustrated in FIG. 6, after the image output data has been stored in the server apparatus 2, the user performs the log-in operation from one of the card readers 5 and 5A, which transmits the user authentication information to the server apparatus 2. The authentication processing unit 222 of the server apparatus 2 executes the user authentication process. If it is determined that the transmitted user authentication information is valid, the authentication processing unit 222 transmits a request to the authentication server apparatus 6 inquiring about the image forming apparatus associated with the apparatus (that is, one of the card readers 5 and 5A) for which the log-in operation was performed. The authentication processing unit 222 receives a response from the authentication server apparatus 6 and specifies, using the response, the image forming apparatus (that is, one of the printers 4 and 4A) that receives the image output data (step S27). Upon receiving the request for inquiring about the image forming apparatus, the authentication server apparatus 6 refers to the apparatus registration data 62, specifies the image forming apparatus associated with the apparatus for which the log-in operation was performed, and then transmits to the server apparatus 2 the response specifying the image forming apparatus.

The output data management unit 21 refers to the apparatus group table and specifies the apparatus group ID information that is related with the apparatus ID information of the specified image forming apparatus. The output data management unit 21 acquires, from among all the image output data stored in the output data storage unit 22, those image output data that are associated with not only the apparatus group ID information, but also with the user authentication information. The output data management unit 21 instructs the communication processing unit 221 to transmit those image output data to the specified image forming apparatus (that is, one of the printers 4 and 4A) (step S28). The communication processing unit 221 transmits those image output data to the specified image forming apparatus through the NIC 205 via the network 7.

If the user authentication has been validated, the printer 4 or the printer 4A associated with the card reader 5 or the card reader 5A, for which the log-in operation was performed, receives those image output data related with the apparatus group ID information, and prints those image output data (step S29).

Accordingly, the image output data is temporarily stored in the server apparatus 2, and unless the user authentication transmitted from the image forming apparatus (for example, the MFP 3 or the printer 4) is validated by the server apparatus 2, the stored image output data is not transmitted to the image forming apparatus. Therefore, secret leakage from the MFP 3 and the printer 4 can be prevented. Further, the image output data is transmitted to the image forming apparatus that is compatible with the output driver. That is, transmission of the image output data to the image forming apparatus incompatible with the output driver is inhibited.

<Tenth Embodiment>

In an image forming system according to a tenth embodiment of the present invention, the apparatus group is according to the manufacturer of the image forming apparatuses. All image forming apparatuses belonging to the apparatus group are manufactured by the same maker. Generally, image forming apparatuses manufactured by the same maker can execute image output processes on image output data in the same data format. The remaining configurations and processes of the system are similar to those in the ninth embodiment.

<Eleventh Embodiment>

In an image forming system according to an eleventh embodiment of the present invention, the apparatus group is prepared as a group including those image forming apparatuses having a common data format for the image output data or having the same manufacturer, and which can perform post-processing with the same finisher function. The term "post-processing with the finisher function" means steps, such as sorting, stapling, and punching, that are performed by a finisher after the printing. The remaining configurations and processes of the system are similar to those in the ninth embodiment.

<Twelfth Embodiment>

An image forming system according to a twelfth embodiment of the present invention is a modification of the first embodiment such that the client apparatus 1 encrypts image output data and the MFP 3 decrypts the encrypted image output data. The encrypted image output data is not decrypted in the server apparatus 2. Accordingly, the image output data can avoid being intercepted by a third person, while the image output data is stored in the server apparatus 2. Therefore, prevention of secret leakage of secrets can be at a higher level. The system configurations and the processes of this embodiment will be described below.

Figure 11:
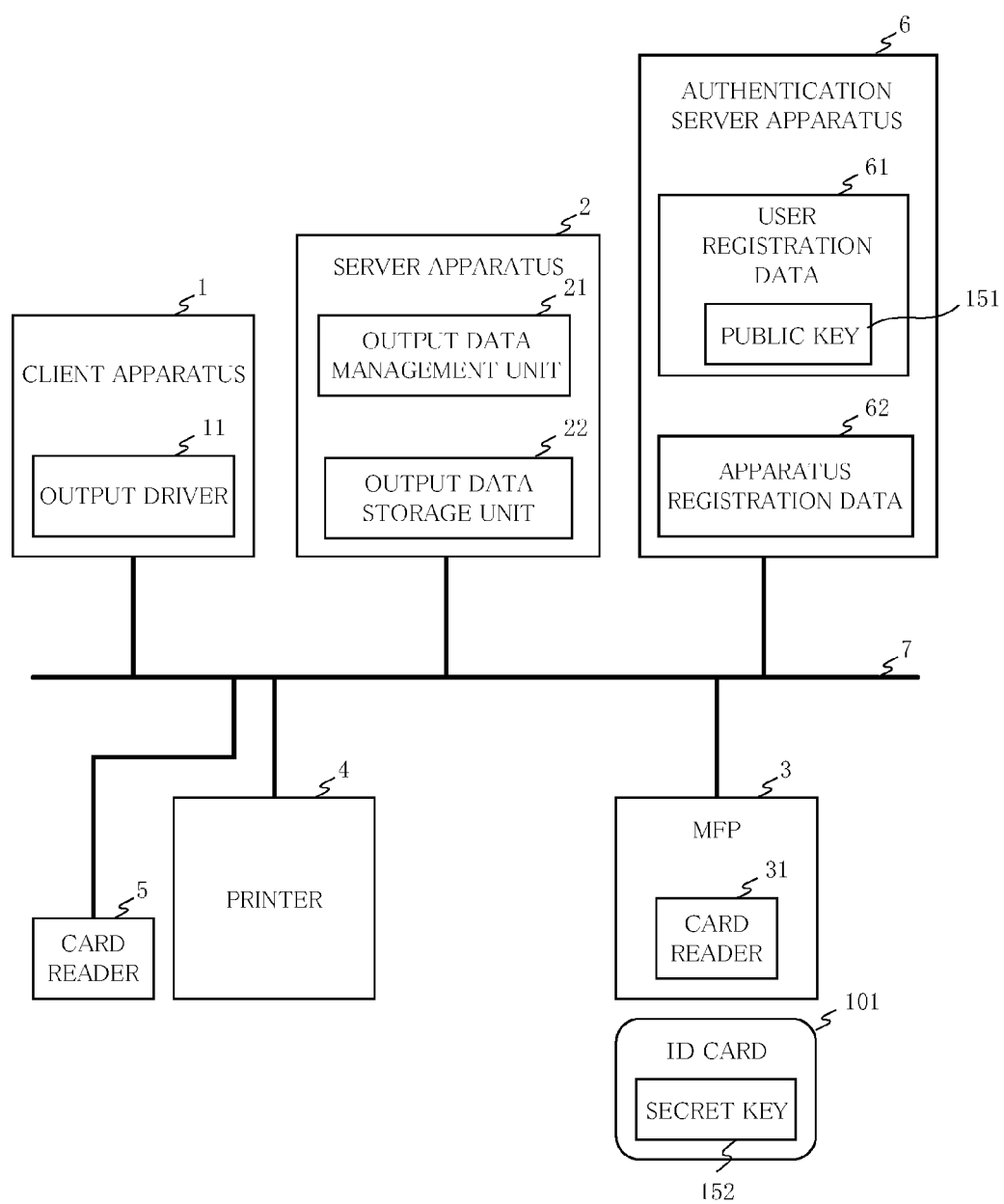
FIG. 11 is a block diagram illustrating the configuration of an image forming system according to a twelfth embodiment.

FIG. 11 is a block diagram illustrating the configuration of an image forming system according to a twelfth embodiment.

In FIG. 11, the user registration data 61 includes a public key 151 for the registered user related with the user authentication information. Further, the ID card 101 of the registered user stores a secret key 152 to pair with the public key. The public key 151 and the secret key 152 in pair are used for an encryption and decryption process in the public key system. The encryption and decryption in the public key system can be executed, for example, by a Diffie Hellman (DH) method or a Rivest Shamir Adleman (RSA) method.

FIG. 12 is a sequence chart to explain a process of causing the MFP to execute a job in the image forming system illustrated in FIG. 11.

In FIG. 12, the output driver 11 of the client apparatus 1 transmits the user authentication information and a request for the public key 151 (step S201), and receives the public key 151 associated with the user authentication information from the server apparatus 2 (step S204). Further, the output driver 11 encrypts the image output data with the received public key 151 (step S205) and transmits the encrypted image output data to the server apparatus 2 (step S2).

The authentication processing unit 222 of the server apparatus 2 transmits the user authentication information and the request for transmitting the public key 151, which have been received from the client apparatus 1, to the authentication server apparatus 6 (step S202). The authentication processing unit 222 receives the public key 151 associated with the user authentication information from the authentication server apparatus 6 (step S203) and transmits the received public key 151 to the client apparatus 1 through the NIC 205 (step S204).

The encrypted image output data is temporarily stored in the server apparatus 2.

When a user has performed a log-in operation in the MFP 3 and the user authentication of the user has been validated (step S9), a list of all encrypted image output data associated with the user authentication information of the user is transmitted to the MFP 3 (step S10). When the encrypted image output data is selected from the list in the MFP 3 (step S11), a request for that encrypted image output data is transmitted from the MFP 3 to the server apparatus 2 (step S12). In response to the request, the output data management unit 21 of the server apparatus 2 acquires that encrypted image output data and transmits the acquired data to the MFP 3 (step S13).

The controller 306 of the MFP 3 acquires the user authentication information and the secret key 152 from the ID card 101 by the card reader 31 and receives the encrypted image output data related with the acquired user authentication information from the server apparatus 2. The controller 306 decrypts the encrypted image output data with using secret key 152 (step S206). Further, the controller 306 controls the image output process to be executed based on the decrypted image output data (step S14).

Accordingly, the image output data is transmitted in the encrypted state from the client apparatus 1 to the MFP 3 through the server apparatus 2 and is not decrypted in the transmitting path including the server apparatus 2. Therefore, the image output data avoid being intercepted by a third person, while the image output data is stored in the server apparatus 2 and is transmitted on the network 7. Therefore, prevention of secret leakage can be at a higher level.

Further, the card reader 31 acquires the user authentication information and the secret key 152 from the ID card 101 storing the secret key 152, and the controller 306 decrypts the image output data using the secret key 152. Therefore, only the registered user having the ID card can execute the image output process of the image output data.

It should be noted that the client apparatus 1 may encrypt the image output data with a different encryption key for each user. This increases prevention of secret leakage of the image output data stored in the server apparatus 2, as compared with case of using a single encryption key.

<Thirteenth Embodiment>

In an image forming system according to a thirteenth embodiment of the present invention, image output data is encrypted and decrypted by a common key system, and a common key used in encrypting and decrypting the image output data is encrypted by a public key system. Further, the encrypted common key is transmitted from the client apparatus 1 to the MFP 3 via the server apparatus 2 together with the encrypted image output data.

The configurations of the image forming system according to the thirteenth embodiment are similar to that in the twelfth embodiment. The client apparatus 1, the server apparatus 2, and the MFP 3 operate as follows.

The output driver 11 of the client apparatus 1 receives the public key 151 from the server apparatus 2 (steps S201 to S204). Further, the output driver 11 generates a common key by using a random number, a pseudo random number, or the like, and encrypts image output data with the generated common key. The output driver 11 encrypts the common key with the public key 151 transmitted from the server apparatus 2 (step S205). In addition, the output driver 11 transmits the encrypted image output data and the encrypted common key to the server apparatus 2 (step S2). The encryption and decryption in the common key system can be performed by, for example, a Data Encryption Standard (DES) method or an Advanced Encryption Standard (AES) method.

The output data management unit 21 of the server apparatus 2 stores the encrypted image output data associated with the encrypted common key received from the client apparatus 1 in a storage device.

When the user performs the log-in operation by placing the ID card 101 near the card reader 31 of the MFP 3, the card reader 31 acquires the user authentication information from the ID card 101, and the MFP 3 transmits the acquired user authentication information to the server apparatus 2. If it is determined that the transmitted user authentication information is valid, steps S10 to S12 are executed such that the output data management unit 21 of the server apparatus 2 transmits the encrypted common key and the encrypted image output data (one or more of the entirety) related with the user authentication information to the MFP 3 (step S13).

In the MFP 3, the card reader 31 acquires the secret key 152 from the ID card 101 together with the user authentication information. Further, the controller 306 of the MFP 3 receives the encrypted image output data and the encrypted common key from the server apparatus 2 through the NIC 301 and decrypts the encrypted common key with the secret key 151. The controller 306 decrypts the encrypted image output data with the decrypted common key (step S206) and executes the image forming process of the decrypted image output data (step S14).

Accordingly, the image output data is encrypted and decrypted by the common key system, and the common key used in encrypting and decrypting the image output data is encrypted by the public key system. The encrypted common key is transmitted from the client apparatus 1 to the MFP 3 through the server apparatus 2 together with the encrypted image output data.

Therefore, the client apparatus 1 need not manage the public key 151. Also, since the public key 151 is managed as a secret key by the server apparatuses 2 and 6, only the user having the secret key 152 can execute a job, even if the public key 151 is stolen from the server apparatuses 2 and 6. Further, since the image output data is encrypted by the common key system, the amount of computations for the encryption and the decryption can be reduced.

<Fourteenth Embodiment>

In an image forming system according to a fourteenth embodiment of the present invention, when the server apparatus 2 receives unencrypted image output data from the client apparatus 1, the server apparatus 2 encrypts the received image output data and stores the encrypted image output data in a storage device. In this case, the authentication processing unit 222 encrypts the image output data.

The authentication processing unit 222 of the server apparatus 2 receives the public key 151 from the authentication server apparatus 6 and encrypts the image output data with the public key 151. That is, the authentication processing unit 222 of the server apparatus 2 executes the steps of acquiring the public key 151 from the authentication server apparatus 6, generating a common key, encrypting the image output data with the common key, and encrypting the common key with the public key 151.

The remaining configurations and processes of the image forming system according to the fourteenth embodiment are similar to those in the twelfth or thirteenth embodiment.

The present invention includes various other embodiments. For example, other designs can be used in which the above-described components are each performed.

For example, the image output data used in the above-described embodiments may be data in formats including not only image formats, such as JPEG (Joint Photographic Experts Group), TIFF (Tagged Image File Format), GIF (Graphics Interchange Format), and PNG (Portable Network Graphics), but also other formats, such as PDF (Portable Document Format) and EPS (Encapsulated Post Script).

While the above-described embodiments basically include one MFP 3, the system configuration may be modified such that a plurality of MFPs is connected to the network 7.

In the above-described embodiments, the function of the authentication server apparatus 6 may be included in the server apparatus 2 instead of in a separate authentication server apparatus 6.

Further, the above-described embodiments may be modified as follows. After the list of the image output data has been displayed, the controller 306 of the MFP 3 may transmit a request to the server apparatus 2 (through the NIC 301) for deleting the selected image output data selected by the user. In that case, when the request for deleting is received by the communication processing unit 221, the output data management unit 21 of the server apparatus 2 deletes the requested image output data from the output data storage unit 22. A session ID is added to the request for deleting.

In the above-described embodiments, the output data management unit 21 of the server apparatus 2 may automatically delete the image output data that has lapsed a predetermined period (for example, one month) from when the image output data was stored.

While in the ninth, tenth and eleventh embodiments the number of image forming apparatuses belonging to one apparatus group 111 or 112 is two, the number of image forming apparatuses belonging to one apparatus group 111 or 112 may be one or three or more. Also, the number of apparatus groups may be three or more.

In the ninth, tenth and eleventh embodiments, each of the output drivers 11 and 11A of the client apparatuses 1 and 1A may transmit, instead of the user authentication information of the user operating the client apparatus 1 or 1A, the user authentication information of another registered user together with the image output data. In that case, the image output data is stored in the server apparatus 2 associated with the user authentication information of the other registered user. When the other registered user logs in, the stored image output data is transmitted to the MFP 3 or 3A to which the other registered user has logged in, or to the printer 4 or 4A associated with the card reader 5 or 5A to which the other registered user has logged in.

In the ninth, tenth and eleventh embodiments, a plurality of different output drivers 11 and 11A may be included in one client apparatus.

In the ninth, tenth and eleventh embodiments, when it is determined that the user authentication information is valid, one or more among the image output data associated with the user authentication information of the user may be included, for example, in the list illustrated in FIG. 5. This may include image data which are related with the apparatus group ID information of an apparatus group other than the apparatus group including the MFP 3 or 3A to which the user has logged in, or the printer 4 or 4A associated with the card reader 5 or 5A to which the user has logged in. In that case, transmission of the image output data to the image forming apparatus (i.e., one of the MFPs 3 and 3A and the printers 4 and 4A), and printing and the facsimile transmission of the image output data are inhibited.

In the ninth, tenth and eleventh embodiments, the server apparatus 2 may store preview image data in an image format (such as JPEG, GIF and PNG) together with the image output data. The server apparatus 2 may transmit, to the image forming apparatus, the preview image data of the image output data associated with the apparatus group ID information of another apparatus group. This enables the user to recognize the presence of the image output data that belong to the user, but which are incapable of being processed for output in the image forming apparatus for which the log-in operation was performed.

The twelfth, thirteenth and fourteenth embodiments may be modified as follows. The public key 151 may be previously stored in the ID card 101 instead of in the server apparatuses 2 and 6. In such a case, a card reader may be provided in the client apparatus 1. Further, the output driver 11 receives the public key 151 from the ID card 101 by using the card reader in the client apparatus 1.

In the twelfth, thirteenth and fourteenth embodiments, a certificate issued from the certificate authority may be attached to the public key 151.

In addition, the twelfth, thirteenth and fourteenth embodiments may be modified as follows. The common key may be previously stored in the ID card 101 instead of in the server apparatuses 2 and 6, with a card reader being provided in the client apparatus 1. The output driver 11 receives the common key from the ID card 101 by using the card reader in the client apparatus 1 and encrypts the image output data using the common key system. Further, the controller 306 of the MFP 3 receives the same common key from the ID card 101 by using the card reader 31 and decrypts the image output data with the common key.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming system comprising:
an image forming apparatus connected to a network;
a server apparatus connected to the network;
a client apparatus connected to the network and generating image output data from document data and transmitting the image output data to the server apparatus; and
an authentication server apparatus connected to the network, including user authentication information and executing user authentication using the user authentication information;
the server apparatus comprising:
a first communication device connected to the network;
a data reception unit configured to receive the image output data through the first communication device;
a data management unit configured to store the image output data in a storage device;
an authentication processing unit configured to receive user authentication information from the image forming apparatus or an electronic apparatus associated with the image forming apparatus, through the first communication device via the network, to transmit the user authentication information to the authentication server apparatus authenticating the user through the first communication device to receive a result of the user authentication from the authentication server apparatus through the first communication device, and to determine whether the user authentication information is validated by the result of the user authentication; and
a data transmission unit configured, when the user authentication information is determined to be valid, to transmit a list of the image output data for a user associated with the user authentication information to the image forming apparatus through the first communication device, to receive a request for transmitting the image output data selected from the list based on a user operation from the age forming apparatus through the first communication device, and to transmit the requested image output data to the image forming apparatus through the first communication device:
the image forming apparatus comprising:
a second communication device connected to the network;
an acquisition unit configured to acquire the user authentication information; and
a control unit configured to transmit the user authentication information to the server apparatus through the second communication device, to receive the list of the image output data for the user from the server apparatus through the second communication device, to select the image output data from the list based on the user operation, to transmit the request for transmitting the selected image output data to the server apparatus through the second communication device, to receive the requested image output data from the server apparatus through the second communication device, and to execute a first image output process after determining whether the user authentication information has been validated and to execute a second image output process without determining whether the user authentication information is valid.

2. The image forming system according to claim 1, wherein the control unit of the image forming apparatus is configured to transmit a request for transmitting usage limit information associated with the user authentication information to the server apparatus through the second transmission device, and to receive the usage limit information through the second transmission device, and
when the user authentication information is determined to be valid, the data transmission unit of the server apparatus is configured, upon receiving the request for transmitting of the usage limit information, to transmit the usage limit information associated with the user authentication information to the image forming apparatus.

3. The image forming system according to claim 2, wherein the control unit of the image forming apparatus is configured to store the received usage limit information when the received usage limit information indicates the amount of usage is unlimited, and is not configured to store the received usage limit information when the received usage limit information indicates the amount of usage being limited.

4. The image forming system according to claim 3, wherein, when the image forming apparatus stores the usage limit information indicating usage is unlimited, the control unit of the image forming apparatus is configured to not transmit the request for transmitting the usage limit information associated with the user authentication information.

5. The image forming system according to claim 1, wherein, when the control unit of the image forming apparatus is configured to access the server apparatus through the second transmission device and no response is received from the server apparatus, the control unit is configured to display an error message on a display device.

6. The image forming system according to claim 1, wherein the image forming apparatus has a user authentication setting that specifies a user authentication method and the server apparatus has a relay process setting that specifies a relay process for the image output data,
wherein the control unit of the image forming apparatus is configured to transmit the user authentication setting to the server apparatus,
wherein the authentication processing unit of the server apparatus is configured, upon receiving the user authentication setting from the image forming apparatus, to determine whether the user authentication setting is compatible with the relay process setting, and
wherein the data transmission unit of the server apparatus is configured to transmit a determination result by the authentication processing unit to the control unit of the image forming apparatus.

7. The image forming system according to claim 6, wherein, when the user authentication setting is incompatible with the relay process setting, the control unit of the image forming apparatus is configured to change the user authentication setting to another setting compatible with the relay process setting, or the authentication processing unit of the server apparatus configured to change the relay process setting to another setting compatible with the user authentication setting.

8. The image forming system according to claim 1, wherein the control unit of the image forming apparatus is configured to not receive the image output data from any apparatus other than the server apparatus.

9. The image forming system according to claim 1, wherein the control unit of the image forming apparatus is configured to inhibit utilization of part of a function of the image forming apparatus for the image output data that is received from any apparatus other than the server apparatus.

10. The image forming system according to claim 1, wherein the control unit of the image forming apparatus is configured to instruct printing of a low-quality image for the image output data that is received from any apparatus other than the server apparatus.

11. The image forming system according to claim 1, wherein, when image output data is received by the second transmission device from any apparatus other than the server apparatus, the control unit of the image forming apparatus is configured to transfer the received image output data to the server apparatus,
wherein the data reception unit of the server apparatus is configured to receive the transferred image output data from the first transmission device, and
wherein the data management unit of the server apparatus is configured to store the received image output data in the storage device.

12. The image forming system according to claim 11, wherein the data management unit of the server apparatus stores the received image output data associated with the user authentication information in the storage device.

13. An image forming system comprising:
an image forming apparatus connected to a network and belonging to one of a plurality of apparatus groups;
a server apparatus connected to the network;
a client apparatus connected to the network and generating image output data from document data and transmitting the image output data to the server apparatus using an output driver; and
an authentication server apparatus connected to the network, including user authentication information, and executing user authentication using the user authentication information.
the server apparatus comprising:
a first communication device connected to the network;
a data reception unit configured to receive the image output data through the first communication device;
a data management unit configured to store the image output data in a storage device, in association with the apparatus group identification information of the apparatus group associated with the output driver;
an authentication processing unit configured to receive user authentication information from the image forming apparatus or an electronic apparatus associated with the image forming apparatus, through the first communication device via the network, to transmit the user authentication information to the authentication server apparatus authenticating the user through the first communication device, to receive a result of the user authentication from the authentication server apparatus through the first communication device, and to determine whether the user authentication information is validated by the result of the user authentication; and
a data transmission unit configured, when the user authentication information is determined to be valid, to transmit at least a portion of the image output data associated with the apparatus group identification information of the apparatus group including the image forming apparatus and associated with the user authentication information, to the image forming apparatus through the first communication device;
the image forming apparatus comprising:
a second communication device connected to the network;
an acquisition unit configured to acquire the user authentication information; and
a control unit configured to transmit the user authentication information to the server apparatus through the second communication device to receive the image output data from the server apparatus through the second communication device, and to execute an image output process on the received image output data;
wherein the apparatus group is a group of image forming apparatuses having a common data format for image output data for use in the image output process;
wherein the output driver is configured to transmit the image output data in the common data format; and
wherein the apparatus group is a group of image forming apparatuses having the same manufacturer.

14. The image forming system according to claim 13, wherein the image forming apparatuses belonging to the same apparatus group have the same post-processing with finisher function including sorting, stapling, and punching that are performed by a finisher after executing the image output process.

15. An image forming system comprising:
an image forming apparatus connected to a network;
a server apparatus connected to the network;
a client apparatus connected to the network and generating image output data from document data, generating a common key, encrypting the image output data with the common key, receiving a public key from the server apparatus, encrypting the common key with the public key, and transmitting the encrypted image output data and the encrypted common key to the server apparatus; and
an authentication server apparatus connected to the network, including user authentication information, and executing user authentication using the user authentication information;
the server apparatus comprising:
a first communication device connected to the network;
a data reception unit configured to receive the encrypted image output data and the encrypted common key through the first communication device;
a data management unit configured to store the encrypted image output data and the encrypted common key in a storage device;
an authentication processing unit configured to receive user authentication information from the image forming apparatus or an electronic apparatus associated with the image forming apparatus, through the first communication device via the network, to transmit the user authentication information to the authentication server apparatus authenticating the user through the first communication device, to receive a result of the user authentication from the authentication server apparatus through the first communication device, to determine whether the user authentication information is validated by the result of the user authentication, and to transmit the public key to the client apparatus through the first communication device; and a data transmission unit configured, when the user authentication information is determined to be valid, to transmit the encrypted common key and at least a portion of the encrypted image output data associated with the user authentication information to the image forming apparatus through the first communication device;

the image forming apparatus comprising:
a second communication device connected to the network;
an acquisition unit configured to acquire the user authentication information and to acquire a secret key to pair with the public key; and
a control unit configured to transmit the user authentication information to the server apparatus through the second communication device, to receive the encrypted image output data and the encrypted common key from the server apparatus through the second communication device, to decrypt the encrypted common key with the secret key, to decrypt the encrypted image output data with the common key, and to execute an image output process on the decrypted image output data.

16. The image forming system according to claim 15, wherein the client apparatus is configured to encrypt the image output data with the unique common key for each user.

17. The image forming system according to claim 15, wherein the acquisition unit is a card reader configured to acquire the user authentication information and the secret key from an ID card.

18. The image forming system according to claim 15, further comprising an authentication server apparatus connected to the network, including the user authentication information and the public key for each of a plurality of users, and executing user authentication using the user authentication information, wherein the authentication processing unit of the server apparatus is configured to transmit the user authentication information from the image forming apparatus to the authentication server apparatus for executing the user authentication through the first communication device, to receive a result of the user authentication from the authentication server apparatus through the first communication device, and to determine whether the user authentication information is validated by the result of the user authentication, and wherein the authentication processing unit of the server apparatus is further configured to receive the public key from the authentication server apparatus and to transmit the public key to the client apparatus.

* * * * *